United States Patent [19]
Tanaka

[11] Patent Number: 6,016,829
[45] Date of Patent: Jan. 25, 2000

[54] CHECK VALVE HAVING FUNCTION OF ADJUSTING FLOW RATE OF FLUID

[76] Inventor: Mikio Tanaka, 386-3, Ichinomoto-cho, Tenri-shi, Nara-ken, Japan

[21] Appl. No.: 08/876,401

[22] Filed: Jun. 16, 1997

[30] Foreign Application Priority Data

Jun. 20, 1996 [JP] Japan ........................... 8-181132

[51] Int. Cl.[7] ....................................................... F16K 3/36
[52] U.S. Cl. ................. 137/246.22; 251/149; 251/149.7; 141/349
[58] Field of Search ................... 251/149.1, 149; 137/246, 246.22, 246.23; 141/349

[56] References Cited

U.S. PATENT DOCUMENTS 4,375,864  3/1983  Savage ................................. 251/149.1
5,641,011  6/1997  Benedetti, Jr. et al. .............. 251/149.4

FOREIGN PATENT DOCUMENTS 3015272  8/1995  Japan .
84698/96  3/1996  Japan .
3025151  6/1996  Japan .

Primary Examiner—A. Michael Chambers
Attorney, Agent, or Firm—Larson & Taylor

[57] ABSTRACT

A check valve having a function of adjusting a flow rate of a fluid and comprising a flat body composed of a plastic film; and a fluid take-out appliance inserted into a duct of the body. The fluid take-out appliance comprises a guide pipe; a flow pipe longer than the guide pipe and shorter than the body and reciprocatively inserted into the guide pipe; a duct-opening member thin rectangular solid-shaped and provided on the flow pipe at a front end thereof; a gripping flange provided on the flow pipe at a rear end thereof; an inlet provided on the flow pipe; one or more engaging grooves provided on the guide pipe at a front end thereof; and a convexity provided on an outer surface of the flow pipe and engaging the engaging grooves of the guide pipe. In this construction, the fluid take-out appliance is inserted into the duct of the body, with an outer surface of the guide pipe in close contact with the duct of the body at a rear side thereof.

4 Claims, 7 Drawing Sheets

CHECK VALVE HAVING FUNCTION OF ADJUSTING FLOW RATE OF FLUID

BACKGROUND OF THE INVENTION

1. Field of the Invention

The present invention relates to a check valve having a function of adjusting the flow rate of a fluid. More particularly, the present invention relates to a check valve which is installed at a side edge of a bag made of a plastic film and has a construction of adjusting the take-out amount of the fluid and is capable of filling the fluid into the bag and taking it out therefrom reliably and preferably.

2. Description of the Related Art

There are proposed many types of check valves for filling a fluid into a bag or a container and taking it out therefrom as necessary. For example, a check valve was devised by the present applicant and registered by the Japanese Patent Office at utility model at No. 3015272.

The registered utility model relates to an appliance (A) for filling a fluid into a sealing bag (B) and taking it out therefrom and to the sealing bag (B) provided with the appliance (A). As shown in FIG. 12, the appliance (A) comprises the guide pipe 21 which is fitted closely in the opening positioned at an edge of the flat check valve (V) consisting of a plastic film and installed at a side edge of. the sealing bag (B); and a flow pipe 22 longer than the guide pipe 21 and inserted thereinto such that it is axially movable therein. At least one guide groove 23 extending axially is formed on the inner surface of the guide pipe 21. At least one engaging step 24 is formed such that the engaging step 24 is apart from the guide groove 23. Further, a convexity 25 having a predetermined length and extending axially is formed on the outer surface of the flow pipe 22 at one side thereof. The convexity 25 is inserted into the guide groove 23. A gripping flange 26 is formed at an end of the flow pipe 22.

Unlike the conventional construction, this construction eliminates the need for performing a troublesome operation of inserting a narrow pipe such as a straw into the flat check valve (V) each time the fluid is filled into the sealing bag (B) and discharged therefrom. That is, this construction allows the fluid to be filled into the sealing bag (B) and discharged therefrom smoothly and reliably at any time and place. But the check valve V has the following problem:

That is, a member for adjusting the flow rate is not provided on the flat check valve (V) made of the plastic film or on the appliance (A) installed in the duct of the check valve (V). Thus, it is impossible to adjust the discharge amount of the fluid. Further, in order to allow the check valve (V) to perform its function, it is necessary to extend the flow pipe 22 in a long distance axially outwardly from the sealing bag (V). Therefore, it is inconvenient to carry the check valve (V) or difficult to handle it. Further, repeated axial reciprocating movement of the duct 22 causes the check valve (V) made of the thin plastic film to be damaged, thus deteriorating its function or making it impossible to perform its function.

The present inventor filed a patent application (application No. 1996-84698) with the Japanese Patent Office on Mar. 12, 1996 (published Sep. 16, 1997) to solve the above-described problem.

SUMMARY OF THE INVENTION

The present invention has been made to solve the above-described problem of the registered utility model No. 3015272. It is accordingly an object of the present invention to provide an improved check valve having a function of adjusting the flow rate of a fluid reliably and easily and preventing its body composed of a plastic film from being damaged against repeated opening and closing operation of a duct thereof.

It is another object of the present invention to provide an improved check valve having a function of adjusting the flow rate of a fluid and eliminating the need for extending an opening/closing member in a long distance axially outwardly so as to allow a person to carry or handle it easily.

It is still another object of the present invention to provide an improved check valve having a function of adjusting the flow rate of a fluid and allowing a person to fill a fluid into a bag and take it out therefrom reliably and favorably.

In one aspect of the present invention, there is provided a check valve having a function of adjusting a flow rate of a fluid and comprising a flat body composed of a plastic film; and a fluid take-out appliance inserted into a duct of the body. The fluid take-out appliance comprises a guide pipe; a flow pipe longer than the guide pipe and shorter than the body and reciprocatively inserted into the guide pipe; a duct-opening member thin rectangular solid-shaped and provided on the flow pipe at a front end thereof; a gripping flange provided on the flow pipe at a rear end thereof; an inlet provided on the flow pipe; one or more engaging grooves provided on the guide pipe at a front end thereof; and a convexity provided on an outer surface of the flow pipe and engaging the engaging grooves of the guide pipe. In this construction, the fluid take-out appliance is inserted into the duct of the body, with an outer surface of the guide pipe in close contact with the duct of the body at a rear side thereof.

In the check valve having a function of adjusting the flow rate of fluid and the construction, the duct of the body can be reliably closed by making the flat plane of the duct-opening member parallel with the flat surface of the body. Thus, the liquid in the bag can be prevented from flowing outside.

At this time, the flow pipe is moved rearward to engage the convexity of the flow pipe with the engaging groove of the guide pipe. Consequently, the flow pipe is moved rearward by the length of the engaging groove, thus making the interval between the front end of the flow pipe and the front end of the body long and increasing the action of the body. Therefore, the duct of the body at the front end thereof can be closed reliably by the internal pressure of the bag.

The liquid filled in the bag can be securely taken out by disengaging the convexity of the flow pipe from the engaging groove of the guide pipe and rotating the flow pipe, namely, the duct-opening member in a desired amount to open the duct of the body. Because the open degree of the duct can be adjusted by adjusting the rotation amount of the duct-opening member, the discharge amount of the liquid in the bag can be adjusted securely per period of time.

At this time, because the interval between the front end of the flow pipe and the front end of the body becomes short as a result of the forward movement of the flow pipe, the duct of the body can be opened smoothly.

The duct of the body is opened and closed by rotating the flow pipe not by moving the flow pipe forward and backward. Thus, the inner surface of the body is damaged to a very low degree. That is, the body is durable.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DESCRIPTION OF THE PREFERRED EMBODIMENTS

Preferred embodiments of the present invention will be described below with reference to the accompanied drawings. A check valve (V), according to an embodiment, having a function of adjusting the flow rate of a fluid comprises a flat body 1 and a fluid take-out appliance 2 inserted into a duct of the body 1.

Figure 11:
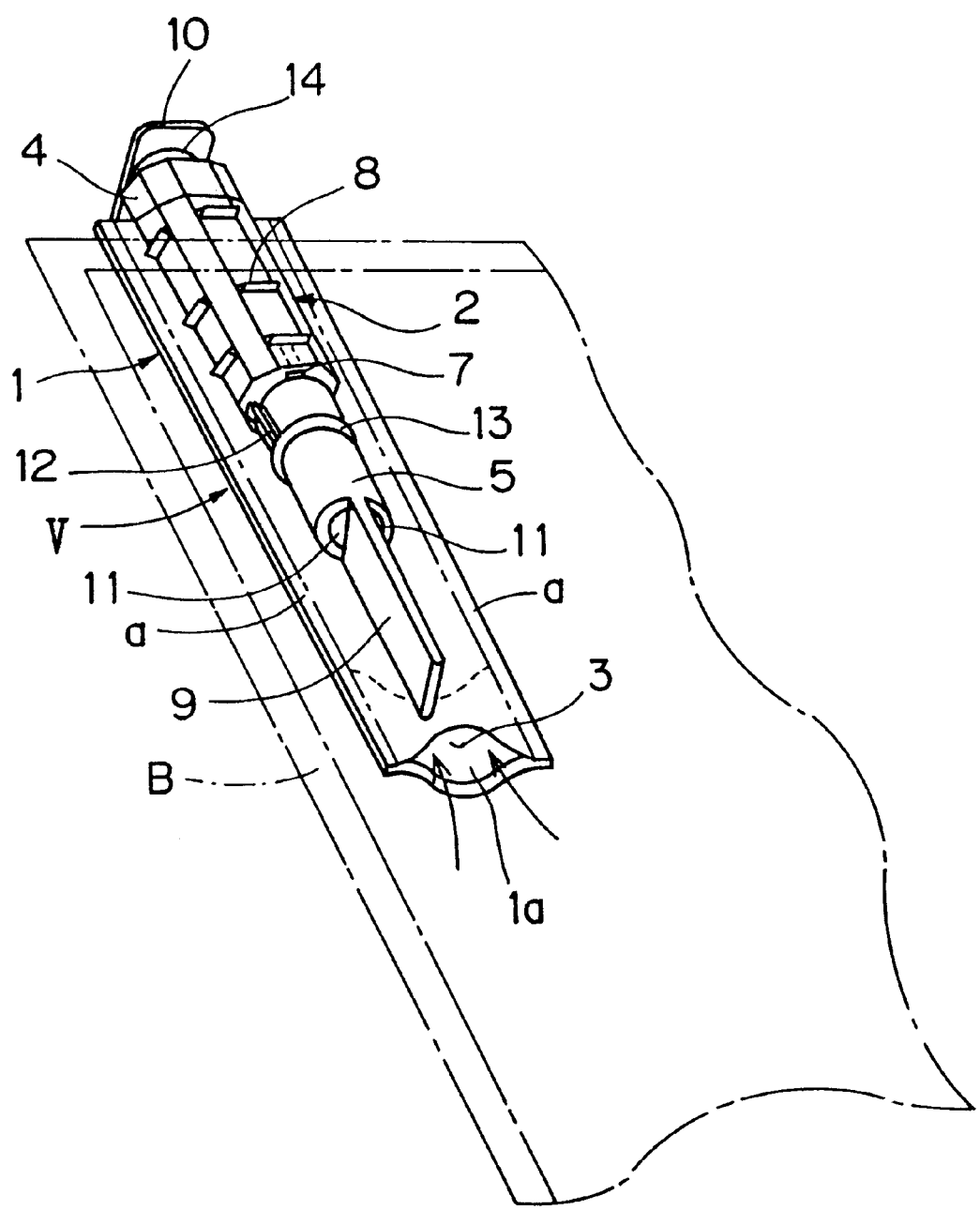
FIG. 11 is a perspective view showing a state in which the flow pipe of the fluid take-out appliance of the check valve having a function of adjusting the flow rate of fluid is rotated to open a duct of the check valve.
Figure 12:
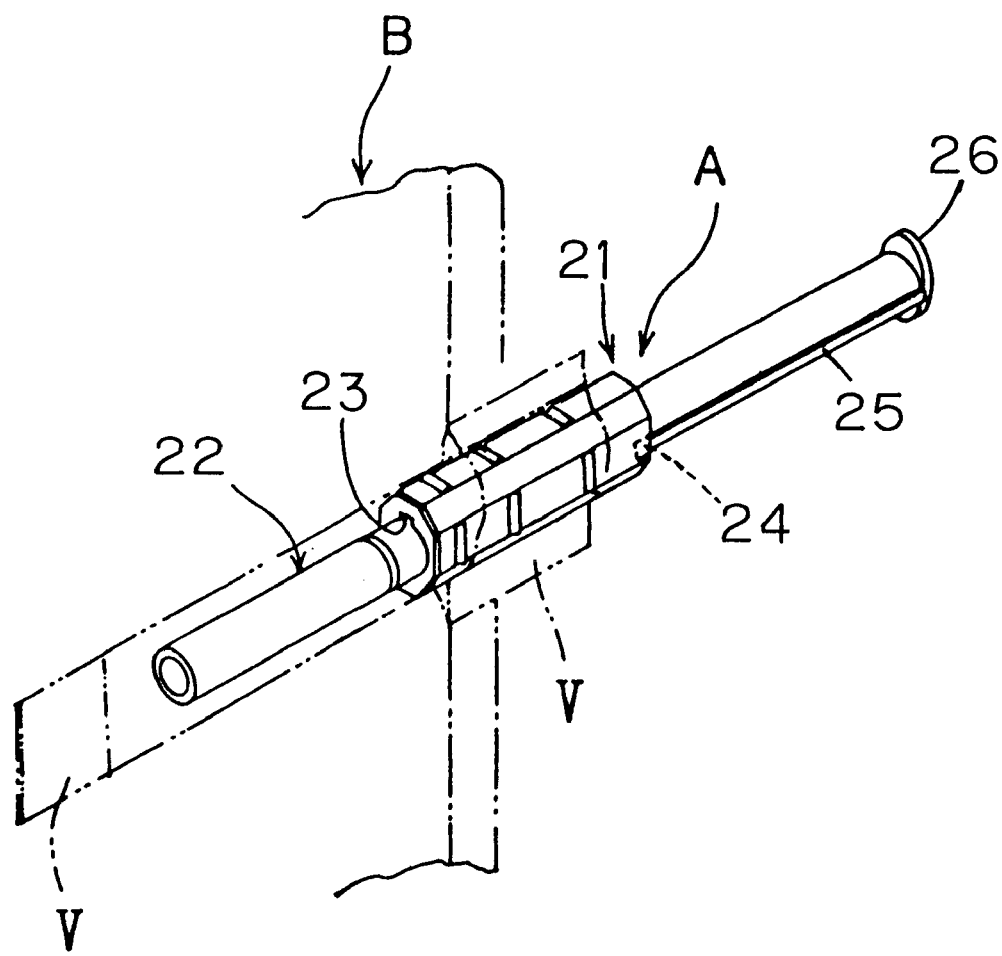
FIG. 12 is an explanatory view showing a state in which fluid is filled into a sealing bag and kept therein by a conventional check valve.

The construction of the flat body 1 is known. That is, the body 1 is formed of two rectangular adhesive plastic films having the same shape and size. As best shown in FIG. 11, both side edges (a) and (a) of each of the plastic films are heated to bond them to each other, with the side edges (a) and (a) laminated on each other. The space formed between the two plastic films is used as a duct 3 in which fluid flows. A rectangular thin plastic film 1a having the function of a check valve is provided in the duct 3 at the front side thereof.

Figure 1:
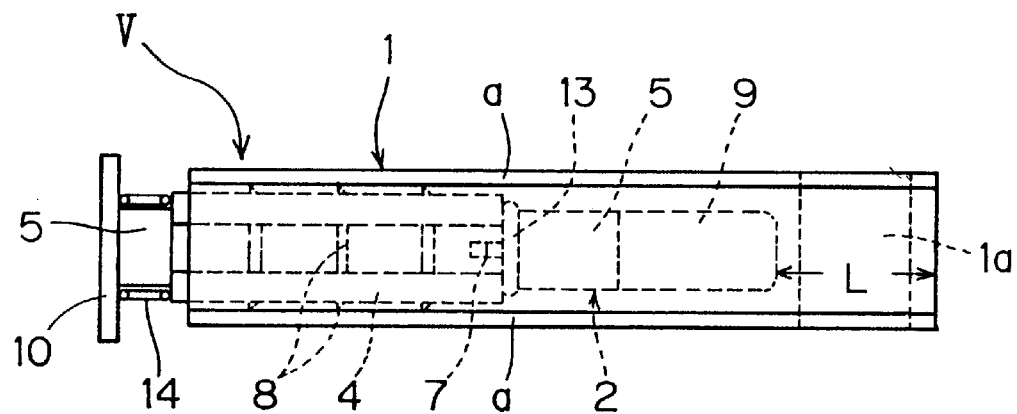
FIG. 1 is a front view showing a check valve of the present invention.
Figure 2:
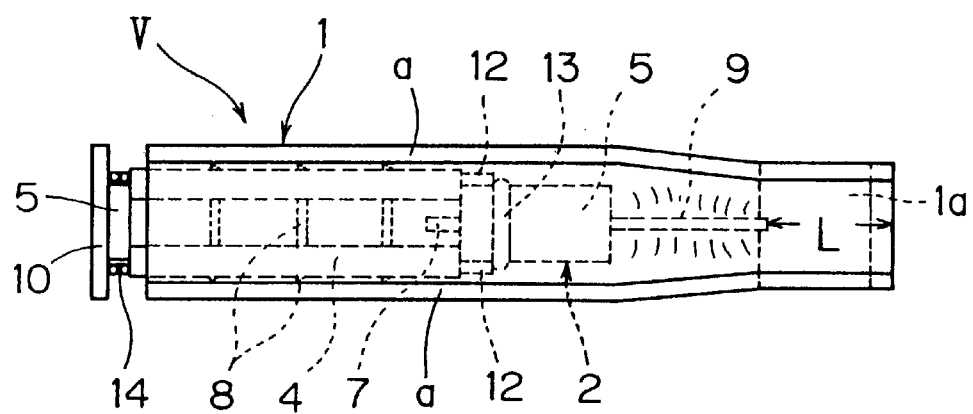
FIG. 2 is a front view showing a state in which a flow pipe of a fluid take-out appliance of the check valve is rotated 90°.
Figure 3:
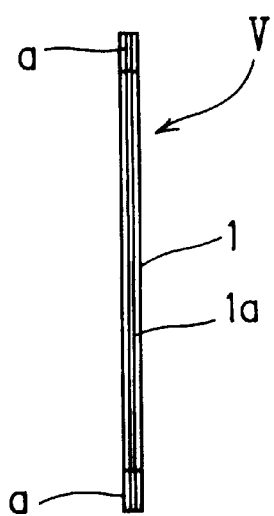
FIG. 3 is an enlarged end elevation viewed from the left-hand side in FIG. 1.

Because the construction of the film 1a is not essential in the present invention, it is not shown in detail in the drawings. Briefly describing the construction of the film 1a, the side edges of the film 1a are bonded to the side edges of the inner surface of one of the two plastic films. In the embodiment, the right-hand side in FIG. 1 is defined as the front side of the body 1 and the left-hand side in FIG. 1 is defined as the rear side thereof. The rear end of the film 1a is bonded to the inner surface of one of the two plastic films, whereas the front end of the film 1a is not bonded to the inner surface of any of the two plastic films so that a closed portion and an open portion are formed in the duct 3 by the film 1a. The open portion means the space between the film 1a and the inner surface of one plastic film as well as the inner surface of the other plastic film. Thus, a liquid is allowed to flow through the space formed between the open portion at the front side of the film 1a and the open portion at the rear side thereof.

Figure 4:
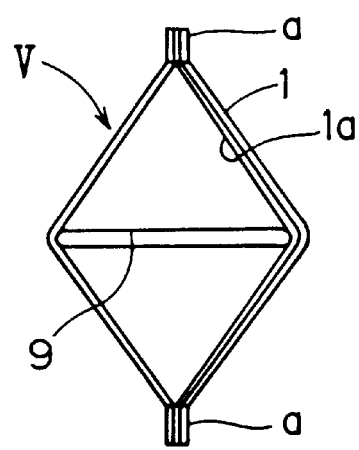
FIG. 4 is an enlarged end elevation viewed from the left-hand side in FIG. 2.

Referring to FIG. 4 showing a state in which the duct 3 is open, an inactive liquid such as silicone oil having a low viscosity and a high degree of adhesive and release performances is applied to the inner surface of one of the two plastic films of the body 1 at the front end thereof and one surface of the film 1a confronting the inactive liquid-applied inner surface of the plastic film of the body 1 to form a thin film on the film 1a and the inner surface of one of the two plastic films of the body 1. Owing to the formation of the thin films, the duct 3 of the body 1 can be easily opened and closed at the front end thereof.

The film 1a and the low-viscosity thin films having a low viscosity serve as means for improving the closing and opening function of the check valve (V). But the film 1a and the thin films are not essential constituent elements of the present invention, because the closing and opening function of the check valve (V) can be displayed even though it is not provided with them.

Figure 10:
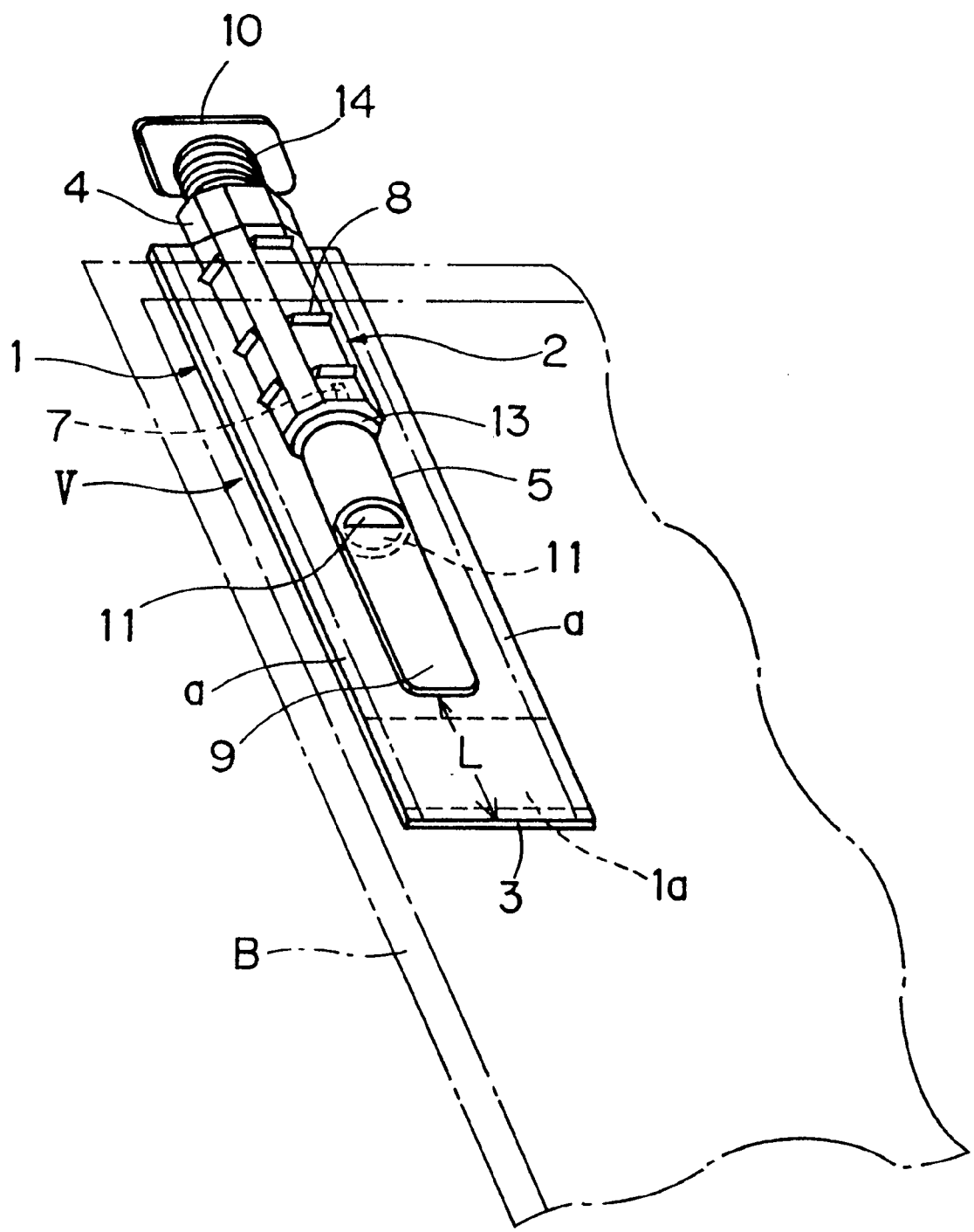
FIG. 10 is a perspective view showing a state in which the check valve check valve having a function of adjusting the flow rate of fluid is installed in a bag.

The fluid take-out appliance 2 comprises a guide pipe 4 which is closely fitted in the duct 3 of the body 1 at the rear side thereof; and a flow pipe 5 which reciprocates inside a hole 6 of the guide pipe 4. As will be described later, the body 1 is installed inside a fluid-containing bag (B) (hereinafter referred to as merely bag (B)), as shown in FIGS. 10 and 11. The flow pipe 5 is longer than the guide pipe 4 and shorter than the body 1.

Figure 5:
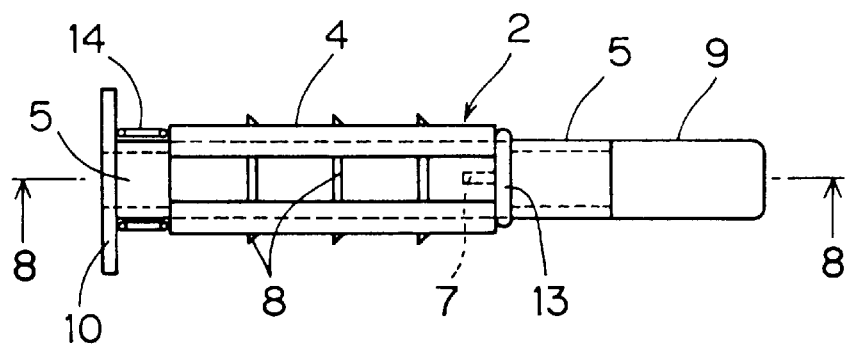
FIG. 5 is a front view showing the fluid take-out appliance.
Figure 6:
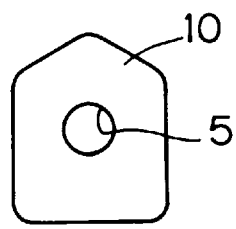
FIG. 6 is a side elevation viewed from the left-hand side in FIG. 5.
Figure 7:
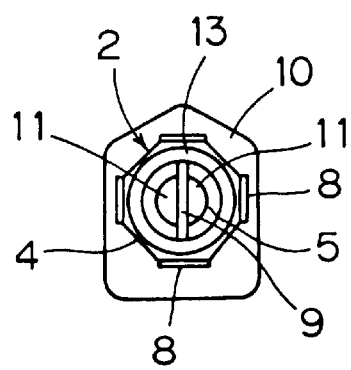
FIG. 7 is a side elevation viewed from the right-hand side in FIG. 5.
Figure 8:
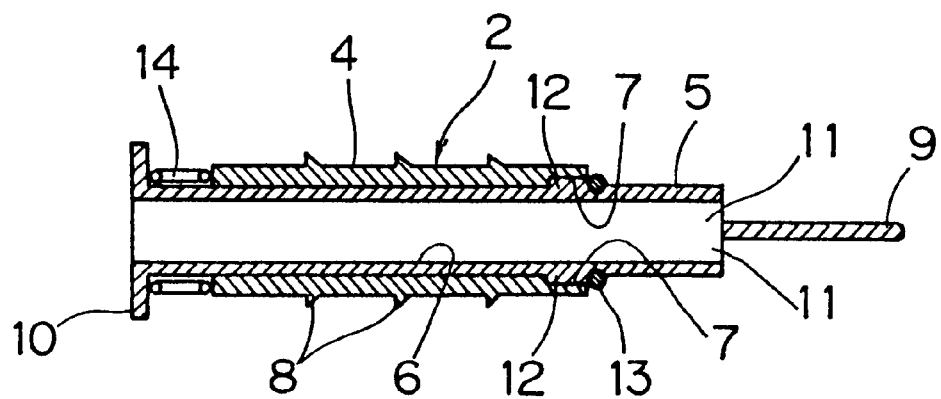
FIG. 8 is a sectional view taken along a line A—A of FIG. 5.
Figure 9:
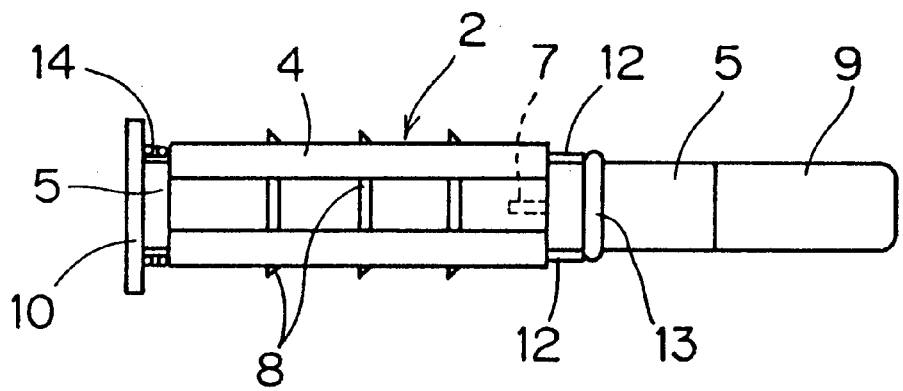
FIG. 9 is a front view showing a state in which a flow pipe of the fluid take-out appliance is rotated to move it forward to disengage it from an engaging groove of a guide groove.

Hard plastic is molded to form the sectionally polygonal guide pipe 4. As best shown in FIGS. 5 and 8, the guide pipe 4 has two engaging grooves 7 and 7 formed at the front end thereof; and a plurality of engaging projections 8 projecting obliquely rearward from the outer surfaces of a plurality of faces of the polygonal guide pipe 4. In the embodiment, the number of the faces is four as shown in FIG. 7.

The flow pipe 5 sectionally circular has a flat duct-opening member 9 projecting forward from the front end thereof; a gripping flange 10 positioned at the rear end thereof; and two semicircular inlets 11 and 11 positioned at both sides of the rear end of the duct-opening member 9. The duct-opening member 9 integral with the flow pipe 5 is made of hard plastic formed by molding hard plastic. The vertical length of duct-opening member 9 is equal to that of the outer diameter of the flow pipe 5. The thickness of the duct-opening member 9 is smaller than the outer diameter of the flow pipe 5.

Two short convexities 12 and 12 engaging the engaging grooves 7 and 7, respectively of the guide pipe 4 are formed axially on the outer surface of the flow pipe 5 at the front side thereof. A sealing O-ring 13 made of an elastic material such as rubber is fitted closely on the outer surface of the flow pipe 5 such that the O-ring 13 is positioned at the front end of the convexities 12 and 12.

The flow pipe 5 is about twice as long as the guide pipe 4 and has such an outer diameter that it smoothly reciprocates inside a hole 6 formed in the guide pipe 4, with the flow pipe 5 in close contact with the inner surface of the guide pipe 4. The convexities 12 and 12, the O-ring 13, and the gripping flange 10 prevent the flow pipe 5 from being removed from the guide pipe 4 in both front and rear sides thereof.

A spring 14 is provided under pressure in the gap between the gripping flange 10 of the flow pipe 5 and the rear end of the guide pipe 4. The elastic force of the spring 14 is always urging the flow pipe 5 rearward.

The check valve (V) is constituted as follows: First, the fluid take-out appliance 2 is inserted into the duct 3 of the body 1 by positioning the gripping flange 10 outward from the body 1 and positioning the front side of the flow pipe 5 inside the body 1 in such a manner that the guide pipe 4 is fitted in the duct 3 of the body 1 at the rear side thereof and that the thin plastic film of the body 1 is brought into close contact with the outer surface of the guide pipe 4. Consequently, owing to the engagement of the engaging projections 8 formed on the outer surface the guide pipe 4 with the thin plastic film of the body 1, there is no possibility that the guide pipe 4 is removed from the body 1.

The use state of the check valve (V), the operation, and effect thereof will be described below with reference to FIGS. 10 and 11 in particular. Initially, the front end of the check valve (V) is inserted into the bag (B) through a side edge thereof, and the gripping flange 10 provided at the rear of the flow pipe 5 is positioned outward from the side edge of the bag (B). In this state, the outer surface of the predetermined portion of the body 1 is brought into close contact with the inner surface of the side edge closely. In this manner, the check valve (V) is installed in the bag (B), with the inside and outside of the bag (B) communicating with each other only through the duct 3 of the body 1 at the front side thereof and the flow pipe 5 of the fluid take-out appliance 2.

In filling the liquid into the bag (B), the liquid is supplied to the body 1 from the rear end of the flow pipe 5 located outward from the bag (B), by using a liquid-supply too. The liquid supplied into the flow pipe 5 flows into the duct 3 at the front side of the body 1 through the inlet 11, thus pressing open the front end of the body 1 and flowing into the bag (B).

Referring to FIGS. 1 and 10 in particular, when a predetermined amount of the liquid has been filled into the bag (B), the supply of the liquid is stopped. Then, the flow pipe 5 is rotated to allow the convexity 12 of the flow pipe 5 to be coincident with the engaging groove 7 of the guide pipe 4. As a result, the convexity 12 of the flow pipe 5 engages the engaging groove 7 of the guide pipe 4 because the flow pipe 5 is constantly urged rearward by the spring 14. Consequently, the flow pipe 5 is moved rearward by the length of the engaging groove 7, thus making the interval (L) between the front end of the flow pipe 5 and the front end of the body 1 long. Thus, the action of the body 1 increases. Therefore, the duct 3 of the body at the front end of the flat body 1 can be closed reliably by the internal pressure of the bag (B). In this manner, the liquid is kept in the bag (B).

It is possible to supply the liquid into the bag (B), with the convexity 12 of the flow pipe 5 in engagement with the engaging groove 7 of the guide pipe 4 before the check valve (V) is inserted into the bag (B).

The liquid can be reliably filled into the bag (B) owing to the reliable and quick motion of the film 1a provided in the duct 3 provided at the front side of the body 1. In addition, because the thin film consisting of an inactive liquid such as silicone oil having a low viscosity and a high degree of adhesive and release performances is formed on one surface of the film 1a and the front end of the inner surface of one of the two plastic films of the body 1 confronting the inactive liquid-applied surface of the film 1a, the film 1a and one of the two the plastic films of the body 1 are allowed to closely contact each other, thus permitting the liquid to flow into the bag (B) easily.

Although not shown, a rubber stopper may be mounted on an opening, of the flow pipe 5, formed at the rear end thereof after the predetermined amount of the liquid is filled into the bag (B) to prevent the liquid from flowing outward from the flow pipe 5 even though the liquid flows into the flow pipe 5 from the front end of the body 1 through the duct 3 and the inlets 11 and 11.

In taking out the liquid filled in the bag (B), the flow pipe 5 is moved forward, with the spring 14 being compressed to disengage the convexity 12 of the flow pipe 5 from the engaging groove 7 of the guide pipe 4, and then the flow pipe 5 is rotated. Supposing that the flow pipe 5, namely, the duct-opening member 9 is rotated by about 90° to change the state shown in FIG. 10 to the state shown in FIG. 11, the duct 3 of the body 1 at the front side thereof is opened greatly by the duct-opening member 9 projecting from the front end of the flow pipe 5. Then, the bag (B) is inclined in this state. As a result, a large amount of the liquid in the bag (B) is taken out in a short period of time from the flow pipe 5 at the rear end thereof through the duct 3 and the inlets 11 and 11.

At this time, because the interval (L) between the front end of the flow pipe 5 and the front end of the body 1 becomes short as a result of the forward movement of the flow pipe 5, the duct 3 of the body 1 can be opened smoothly.

When a small amount of the liquid is desired to be taken out from the bag (B) per period of time, the rotation amount of the flow pipe 5, namely, the duct-opening member 9 is reduced to a smaller degree to decrease the open degree of the duct 3.

As apparent from the foregoing description, the present invention provides the following advantages:

(1) The duct 3 of the body 1 can be reliably closed by making the flat plane of the duct-opening member 9 parallel with the flat surface of the body 1, as shown in FIG. 10. Thus, the liquid in the bag (B) can be prevented from flowing outside.

(2) At this time, the flow pipe 5 is moved rearward to engage the convexity 12 of the flow pipe with the engaging groove 7 of the guide pipe 4. Consequently, the flow pipe 5 is moved rearward by the length of the engaging groove 7, thus making the interval (L) between the front end of the flow pipe 5 and the front end of the body 1 long and increasing the action of the body 1. Therefore, the duct 3 of the body at the front end thereof can be closed reliably by the internal pressure of the bag (B). In this manner, the liquid can be kept in the bag (B) securely.

(3) The liquid filled in the bag (B) can be securely taken out by disengaging the convexity 12 of the flow pipe 5 from the engaging groove 7 of the guide pipe 4 and rotating the flow pipe 5, namely, the duct-opening member 9 in a desired amount to open the duct 3 of the body 1, as shown in FIG. 11. Because the open degree of the duct 3 can be adjusted by adjusting the rotation amount of the duct-opening member 9, the discharge amount of the liquid in the bag (B) can be adjusted securely per period of time.

(4) At this time, because the interval (L) between the front end of the flow pipe 5 and the front end of the body 1 becomes short as a result of the forward movement of the flow pipe 5, the duct 3 of the body 1 can be opened smoothly.

(5) The duct 3 of the body 1 is opened and closed by rotating the flow pipe 5 not by moving the flow pipe 5 forward and backward. Thus, the inner surface of the body 1 is damaged to a very low degree. That is, the body 1 is durable.

(6) The flow pipe 5 is moved rearward slightly to engage the flow pipe 5 with the guide pipe 4. That is, the flow pipe 5 is not moved outward in a great amount from the bag (B). Thus, it is easy to carry and handle the check valve (V).

(7) Because the flow pipe 5 is always urged rearward by the spring 14 provided in the gap between the gripping flange 10 of the flow pipe 5 and the rear end of the guide pipe 4, the flow pipe 5 can be engaged reliably by the guide pipe 4 and further, the adjusted open degree of the duct-opening member 9 can be securely maintained after the flow pipe 5 is disengaged from the guide pipe 4.

(8) Because the film 1a having the function of a check valve is provided in the duct 3 at the front side of the body 1, the check valve (V) is capable of preventing the liquid filled in the bag (B) from flowing into the body 1.

(9) Because the thin film consisting of the inactive liquid such as silicone oil having a low viscosity and a high degree of adhesive and release performances is formed on one surface of the film 1a and the front end of the inner surface of one of the two plastic films of the body 1 confronting the inactive liquid-applied surface of the film 1a, the film 1a and one of the plastic films of the body 1 are allowed to closely contact each other, thus permitting the liquid to flow into the bag (B) easily.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

In addition to liquid, needless to say, the fluid which is filled in the bag (B) includes air, gas, and the like.

What is claimed is:

1. A check valve having a function of adjusting a flow rate of a fluid and comprising a flat body composed of a plastic film; and a fluid take-out appliance inserted into a duct of the body, wherein the fluid take-out appliance comprises:

a guide pipe;

a flow pipe longer than the guide pipe and shorter than the body and reciprocatively inserted into the guide pipe;

a duct-opening member thin rectangular solid-shaped and provided on the flow pipe at a front end thereof;

a gripping flange provided on the flow pipe at a rear end thereof;

an inlet provided on the flow pipe;

one or more engaging grooves provided on the guide pipe at a front end thereof; and a convexity provided on an outer surface of the flow pipe and engaging the engaging grooves of the guide pipe, the fluid take-out appliance being inserted into the duct of the body, with an outer surface of the guide pipe in close contact with the duct of the body at a rear side thereof.

2. The check valve according to claim 1, wherein an inlet is formed at a rear end of the duct-opening member provided at the front end of the flow pipe.

3. The check valve according to claim 1, wherein a spring is provided under pressure in a gap between the gripping flange of the flow pipe and the rear end of the guide pipe, thus constantly urging the flow pipe rearward.

4. The check valve according to claim 1, wherein a thin film consisting of an inactive liquid such as silicone oil having a low viscosity and a high degree of adhesive and release performances is formed on an inner surface of the body at a front end thereof.

* * * * *